United States Patent Office.

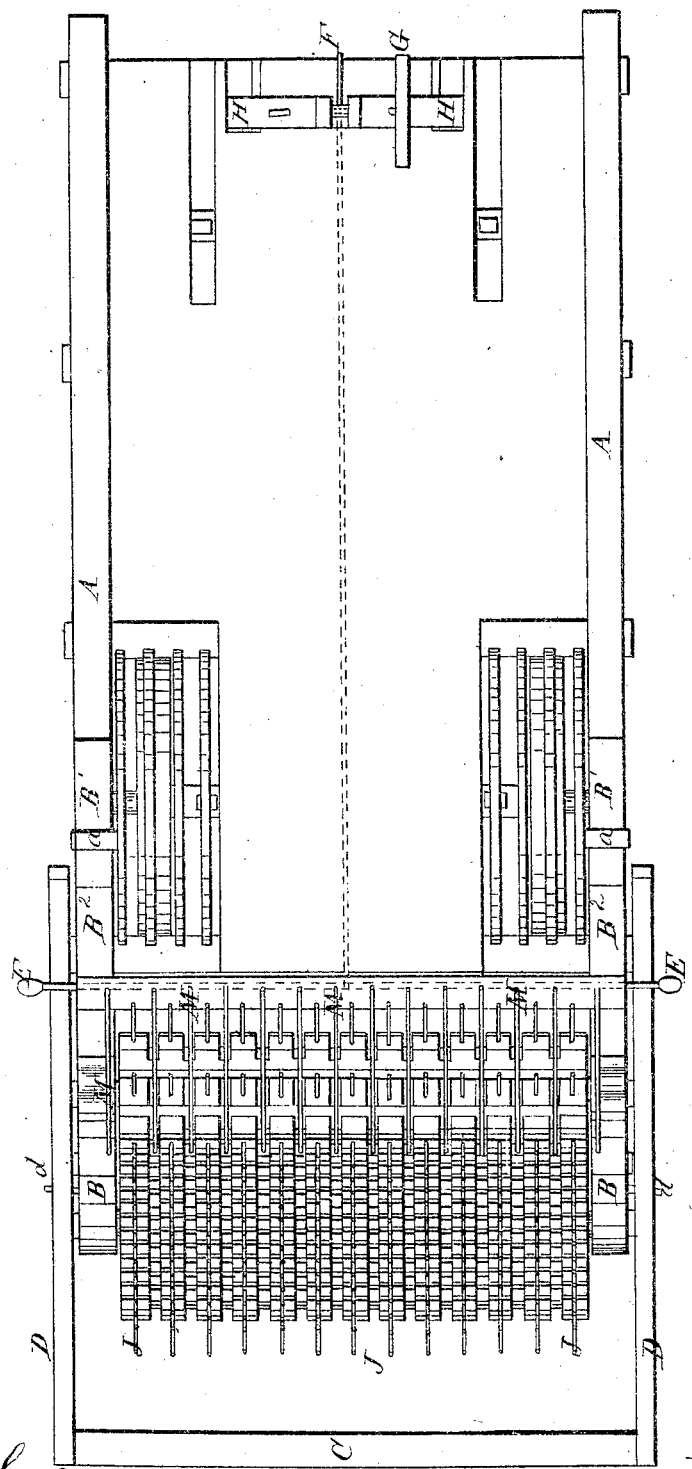

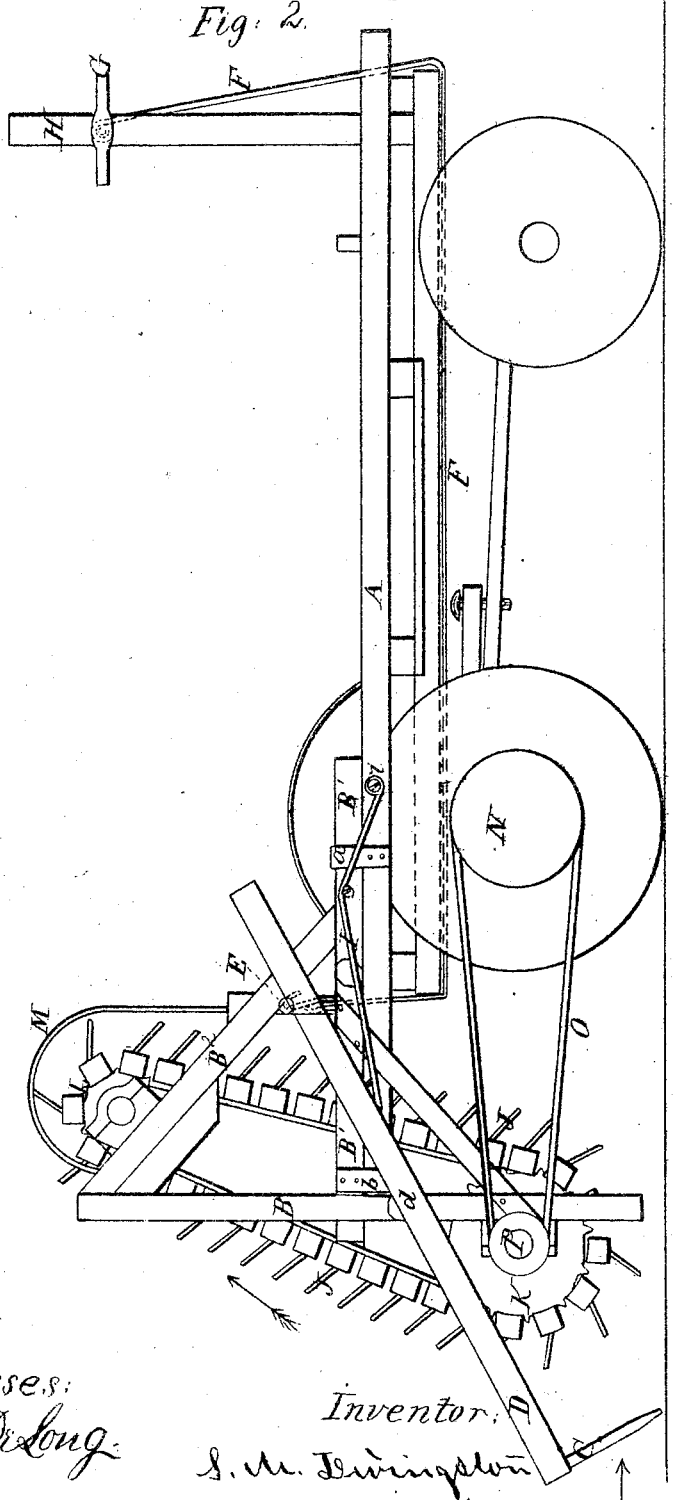

STEPHEN M. LIVINGSTON, OF CLAVERACK, NEW YORK.

Letters Patent No. 73,731, dated January 28, 1868; antedated January 17, 1868.

---

IMPROVEMENT IN HAY-RAKERS AND LOADERS.

---

*The Schedule referred to in these Letters Patent and making part of the same.*

---

TO ALL WHOM IT MAY CONCERN:

Be it known that I, STEPHEN M. LIVINGSTON, of Claverack, in the county of Columbia, and State of New York, have invented a certain new and useful Improvement in Hay-Rakers and Loaders, of which the following is a full, clear, and exact description, reference being had to the accompanying drawings, which make part of this specification, and in which—

Figure 1 represents a plan or top view of an ordinary hay-wagon, with my invention applied thereto, and Figure 2 a view in elevation of one side of the same, It is the object of my invention automatically to rake and load into a wagon, hay lying loosely on a meadow, by simply driving a wagon over it; and my invention consists in certain novel devices for accomplishing this object, hereinafter more fully described.

The side pieces A of the wagon-body project three or four feet behind the other parts of the frame, in order to support the elevator-frame. This frame consists of a vertical standard, B, a horizontal bar, $B^1$, and a diagonal brace, $B^2$, arranged on each side of the wagon, so as to form a firm support for the raking and loading-devices. The horizontal bars $B^1$ lie on top of the side pieces A, and are firmly held by loops $a$, on the frame into which they are inserted, and by corresponding loops $b$, on the bars $B^1$, which loops slip over or embrace the side pieces A. As all the raking and loading-mechanism is attached to this frame, it is obvious that it can readily be attached to or removed from the wagon, by drawing the bars $B^1$ out of their loops, and be left in the field while the wagon is being unloaded, or under shelter while it is used for other purposes. The rake-head C is connected at each end with an arm or balance-lever, D, pivoted to play vertically on a fulcrum, $d$, on the uprights or standards B. A cross-bar, E, is shown in this instance as resting upon the upper ends of these levers, but may, if preferred, be connected directly with them. A rope, F, passes down from this bar underneath the frame, and is conducted over suitable pulleys to the front of the wagon, where it is wound round a windlass, G, mounted on a frame, H. The driver or attendant, by drawing down the upper end of the levers D, can thus stop the action of the rake by lifting its teeth above the hay. The rake is held down to its work, when the cord F is relaxed, by springs I, pivoted at $i$ to the side pieces A, and bearing against the under side of the levers D. The elevator or loader J consists of an endless apron, formed of a series of parallel slats armed with rake-teeth, and traversing over sprocket-wheels K L, mounted in suitable bearings in the detachable frame B. A series of stripping-teeth, M, is arranged on a cross-bar, supported on this frame in front of the elevator. These teeth are parallel to each other, and to the line of motion of the elevator-teeth. They are curved over the elevator-teeth at their upper ends, and their points enter grooves in the endless apron, by which means the hay is prevented from getting under them.

The operation is as follows: As the wagon is drawn over the field, the hay is collected by the teeth of the rake C. The elevator, which is driven by bands O, encircling pulleys P on the axle of the lower wheel K, moves in the direction shown by the arrow. The hay is carried over the top of the elevator, stripped off by the teeth M, and falls into the body of the wagon.

What I claim as my invention, and desire to secure by Letters Patent, is—

1. The combination, substantially as described, of the rake, the balance-levers, the rope and windlass, whereby the rake can be controlled from the front of the wagon, as set forth.

2. The combination, as described, of the rake-arms or balance-levers, mounted on the detachable frame, with the pressure-springs mounted on the main frame.

STEPHEN M. LIVINGSTON.

Witnesses:
ALEX. S. ROWLEY,
JOS. D. FULLER.